United States Patent [19]

Nishida et al.

[11] Patent Number: 4,752,721
[45] Date of Patent: Jun. 21, 1988

[54] CHARGED PARTICLE BEAM DEFLECTOR AND FLAT CRT USING THE SAME

[75] Inventors: Jun Nishida, Tokyo; Yoshikazu Kawauchi, Kawasaki; Hiroshi Miyama, Yokohama; Kaoru Tomii, Isehara, all of Japan

[73] Assignee: Matsushita Electric Industrial Co., Ltd., Japan

[21] Appl. No.: 774,801

[22] Filed: Sep. 11, 1985

[30] Foreign Application Priority Data

| Sep. 12, 1984 [JP] | Japan | 59-191009 |
| Oct. 29, 1984 [JP] | Japan | 59-227149 |
| Nov. 6, 1984 [JP] | Japan | 59-233639 |
| Apr. 3, 1985 [JP] | Japan | 60-70273 |
| Sep. 9, 1985 [JP] | Japan | 60-198801 |

[51] Int. Cl.⁴ .................. H01J 29/70; H01J 29/46
[52] U.S. Cl. ..................... 315/366; 315/14; 313/422; 313/427
[58] Field of Search .......... 315/366, 410, 10, 14, 315/364, 17; 313/421, 422, 426, 227, 429, 432, 434, 439

[56] References Cited

U.S. PATENT DOCUMENTS

| 2,795,731 | 6/1957 | Aiken | 315/366 |
| 2,880,365 | 3/1959 | Law et al. | 315/366 |
| 3,215,888 | 11/1965 | Havn et al. | 315/366 |
| 3,323,000 | 5/1967 | Mancebo | 315/14 |
| 3,683,224 | 8/1972 | Lea | 313/422 |
| 3,890,541 | 6/1975 | McCarthy et al. | 315/366 |
| 3,935,500 | 1/1976 | Oess et al. | 313/495 |
| 4,118,651 | 10/1978 | Scott | 313/422 |
| 4,362,966 | 12/1982 | Credelle | 315/366 |
| 4,417,184 | 11/1983 | Takesako et al. | 315/366 |
| 4,451,846 | 5/1984 | Iyehara et al. | 315/366 |

OTHER PUBLICATIONS

Spangernberg, K. R., "Vacuum Tubes", 1948 McGraw-Hill, pp. 101 and 412.

Primary Examiner—Theodore M. Blum
Assistant Examiner—David Cain
Attorney, Agent, or Firm—Lowe, Price, LeBlanc, Becker & Shur

[57] ABSTRACT

A charged-particle beam electric field deflector includes plural (n) pairs or sets of facing deflection electrodes to accelerate and deflect the beam. Different d.c. acceleration voltages are superimposed on a common deflection voltage and applied to the electrode pairs so that electrode pair k is responsive to acceleration voltage k and the common voltage, where k is selectively each of 1 ... n. The distance between each pair of facing electrodes is constant or increases along the beam path, while the length of each of the deflection electrodes has a given relationship as a function of the distance between the facing electrodes of each pair. The deflector is used in a flat CRT.

31 Claims, 16 Drawing Sheets

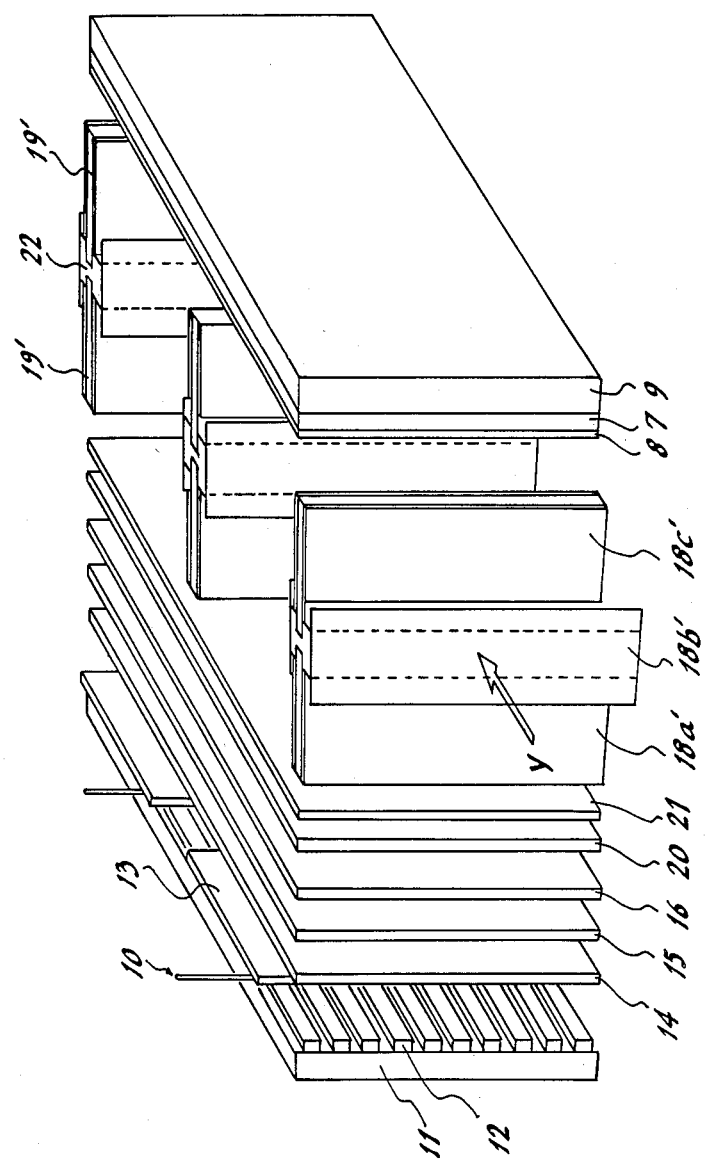

CHARGED PARTICLE BEAM DEFLECTOR AND FLAT CRT USING THE SAME

BACKGROUND OF THE INVENTION

The present application is related to the co-pending commonly assigned application of Tomii et al, Ser. No. 748,833, filed June 26, 1985. This co-pending application is directed to a flat CRT using a deflector of electric field type.

This invention relates to charged-particle beam deflectors and flat cathode-ray tube (CRT) using the same, which are used for displaying figures and TV pictures by way of charged-particle beam using an electron beam or ion beam which is deflected by an electric field.

It is well known that a charged-particle beam is refracted by an electric field to obtain deflection, and the principle of such deflection is disclosed, for instance, on page 101 of "Vacuum Tubes" written by K. R. Spangernberg published by McGraw-Hill in 1948. Various types of deflectors have hitherto been provided, and electron beam deflection electrodes or deflection plates used for sweeping an electron beam within a CRT, such as a TV picture tube or oscilloscope tube, are of this sort.

Two typical types of electron beam deflection electrodes are known, one being a simple parallel flat type, and the other being a curved type wherein the electrodes are curved along the orbit or path of a charged-particle beam for effective deflection. When a voltage is applied to such deflection electrodes, the orbit of the particles is bent in the direction of the electric field. The characteristic of deflectors is usually represented by the displacement of the travelling particles at the target where the particles reach after deflection. Namely, the displacement ys from the center of deflection electrode on the target is given, as shown on page 412 of the abovementioned "Vacuum Tubes", by:

$$ys = \frac{lbVd}{2aVo}$$

wherein

Vo is a voltage [V] for accelerating particles entering the deflector;

Vd is a voltage [V] applied across deflection electrodes;

a is a distance [m] between the facing deflection electrodes;

b is a length [m] of the deflection electrodes measured in a direction of nondeflected beam path; and l is the distance [m] between the center of the deflection electrodes and the target;

The voltage Vd required for deflection is referred to as a deflection voltage. It is preferable in practice to obtain a larger deflection displacement ys by using less deflection voltage. To this end, it is necessary for (1) distance "a" between a pair of facing deflection electrodes to be small and the length "b" of the deflection electrodes and the distance l between the center of the deflection electrodes and the target to be large or the acceleration voltage Vo of the particles to be low. Since deflected particles would collide with the deflection electrodes if the distance "a" between the pair of deflection electrodes is small and the length "b" of the same is large, there is a limit in each of these sizes. Similarly, when the distance l between the deflection electrodes and the target is large, it results in large-sized equipment; for instance, in the case of a CRT for a TV, the depth of the entire structure would be very large. Nextly, while it is effective to reduce the acceleration voltage Vo, this acceleration voltage Vo is defined usually in view of the utilization of particle beam. For instance, in the case of a CRT for a TV set, since the fluorescent material painted on the target is excited by the cathode ray, i.e. the electron beam, to cause the material to emit light so as to display an image, the acceleration voltage Vo must have a high value which is over 1.0 kV in order to obtain necessary luminance. To solve this problem in conventional arrangements, a post accelerating system has been used. More specifically, the particles travel at a low speed when passing the deflection electrodes to receive sufficient deflection force, and the particles are accelerated after passing the same during travelling to the target. However, with this method the electron path is bent radially inwardly due to the lens operation caused by the disturbance of the electric field at the outlet of the deflection system and due to the accelerating electric field applied thereafter, and thus it is difficult to obtain high deflection sensitivity. In order to improve this, a mesh is located at the outlet of the deflection system to avoid the disturbance of electric field, but there have been various drawbacks such that the utilizing rate of the beam is reduced, secondary electrons are generated, disturbance of beam focusing occurs and so on.

As described above, in the conventional arrangement, in order to obtain large deflection displacement, namely to obtain sufficient deflection sensitivity, using a lower deflection voltage, it is necessary that the deflection voltage be high, the length of the deflection electrodes be long, or a post accelerating system be used. However, a high deflection voltage results in high deflection power while there are some limits caused by circuit techniques, and, therefore, lengthening the deflection electrodes suffers from the problem of particle collisions with the deflection electrodes and from the depth-increase problem. Furthermore, with the post accelerating system, there is the problem of undesirable images being displayed in addition to the above-described various problems of deflection sensitivity relating to electric field disturbance at the outlet of the deflection system and to the occurrence of the secondary electrons and reduction in utilization rate of the electron beam due to the mesh.

SUMMARY OF THE INVENTION

The present invention has been developed in order to remove the above-described drawbacks inherent in the conventional deflection system.

It is, therefore, an object of the present invention to provide a new and useful deflection system with which a particle beam entering a deflector at a low speed is accelerated and deflected, and beam focusing aberration in a deflection range is reduced to obtain a satisfactory beam focusing spot and high-deflection sensitivity.

Another object of the present invention is to provide a flat CRT having reduced power consumption and enhanced electron beam characteristics with reduced manufacturing and assembling tolerances of the respective electrodes in the electron beam path.

A further object of the present invention is to provide a flat CRT having vertical and horizontal focusing.

In accordance with the present invention, there is provided a charged-particle beam deflector having plural pairs of flat or curved facing electrodes arranged so different d.c. voltages are applied to respective electrodes and a deflection voltage is commonly superimposed on the electrodes.

In one embodiment of the present invention, the distance between a pair of facing electrodes changes stepwise throughout the plural pairs in the direction of the charged-particle beam path.

The deflector may be applied to a flat CRT, which is disclosed in the above-mentioned co-pending application so as to perform horizontal and/or vertical deflection.

BRIEF DESCRIPTION OF THE DRAWINGS

The object and features of the present invention will become more readily apparent from the following detailed description of the preferred embodiments taken in conjunction with the accompanying drawings in which:

FIG. 13 is a perspective view of another embodiment of a flat CRT according to the present invention;

The same or corresponding elements and parts are designated with like reference numerals throughout the drawings.

DETAILED DESCRIPTION OF THE INVENTION

Figure 1A:
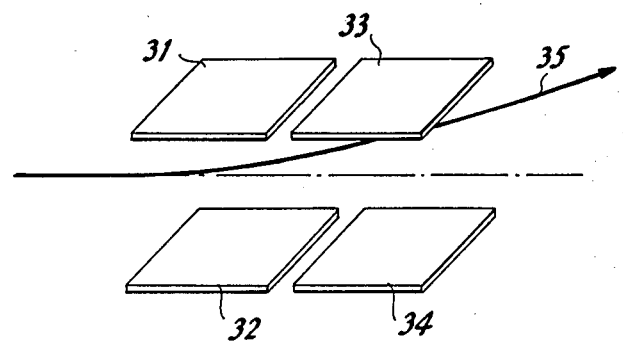
FIGS. 1A and 1B are perspective views of one embodiment of a charged-particle beam deflector according to the present invention.
Figure 1B:
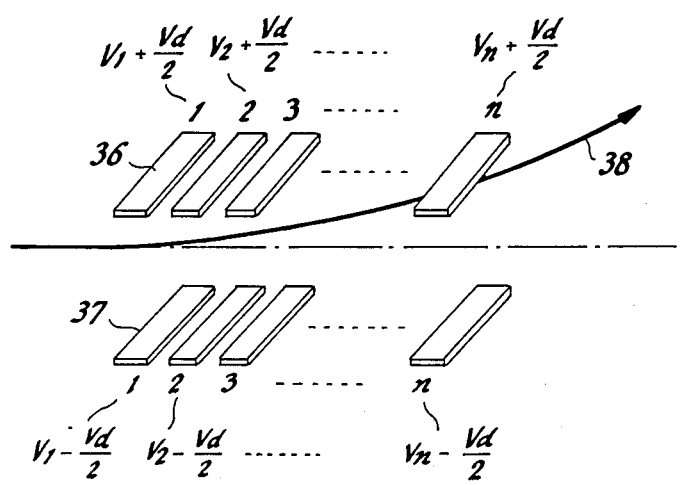

In FIGS. 1A and 1B are illustrated two examples of an embodiment of an electric field deflector according to the present invention. The examples of FIGS. 1A and 1B respectively include two and n pairs of deflection electrodes. In both arrangements, each electrode pair comprises two facing electrodes. In other words, while a conventional deflector comprises a single pair of facing electrodes, each electrode of the conventional pair is in the present invention split into two or more electrode sections extending in the direction of a charged-particle beam path, to provide plural electrode pairs. Electrodes 31 and 33 (FIG. 1A) are located on one side of the path while electrodes 32 and 34 are located at the other side of the path so they respectively face electrodes 31 and 33. In FIG. 1B, there are "n" sets of or pairs of deflection electrodes 36 and 37 on opposite sides of path 38. In FIGS. 1A and 1B, the particle beams in paths 35 and 38 are deflected by applying a voltage between the deflection electrodes. In order that the charged-particle beam deflectors of FIGS. 1A and 1B operate, different d.c. voltages are applied respectively to different sets of deflection electrodes each having a pair of facing electrodes. The entire deflector comprises a plurality of pairs of deflection electrodes referred to as a deflection electrode assembly or simply as a deflector.

Generally speaking, in a deflection system having two pairs of electrodes, the electric field around particles entering and leaving the deflector system cannot vary when the electric potential of the deflection electrodes at the entering side equals the electric potential of the CRT electrode located in front of the deflector and the electric potential of the deflection electrodes at the particle leaving side equals the electric potential of a CRT electrode located behind the deflector, such as the potential of the anode. As a result, refraction of the electron path due to electron lens field does not occur; in addition, the focal length of the electron beam does not change. However, since there is a step in the applied d.c. voltage at a split point, i.e. the boundary between two consecutive pairs of deflection electrodes within the deflector, the electron beam is refracted and the electron beam focusing point changes. In addition, this potential difference is unequivocally determined in the case of two sets of electrodes, and thus design freedom is lost. For this reason, it is preferable for three or more pairs of electrodes to be used such that the first pair located at beam inlet and the last pair located at beam outlet are arranged to have electric potentials respectively equal to the potentials at the front and rear of the deflector. With this arrangement, it is possible to design the deflector so that the electric potential is adjusted to satisfy various requirements, such as beam-reaching distance, focal length and so on. The applied voltages are such that the voltages stepwise, monotonically increase in a direction from the first pair of electrodes to the last pair of electrodes in the case of acceleration. In addition, a common deflection voltage is superimposed on these stepwise-changing voltages. Assuming that the common deflection voltage is expressed in terms of Vd/2, the voltages applied to the electrodes on one side of the path are $V1+Vd/2$, $V2+Vd/2$, ..., $V3+Vd/2$ while the voltages applied to the electrodes on the other side are $V1-Vd/1$, $V2-Vd/2$, ..., $V3-Vd/2$. In the case of deceleration, the applied voltages stepwise decrease in a direction from the first electrode pair to the last electrode pair.

Figure 2A:
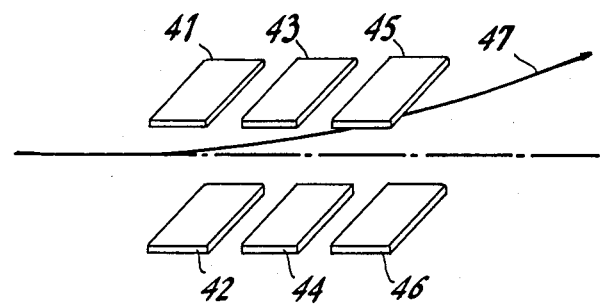
FIG. 2A is a perspective view of a second embodiment of a charged-particle beam deflector according to the present invention.
Figure 2B:
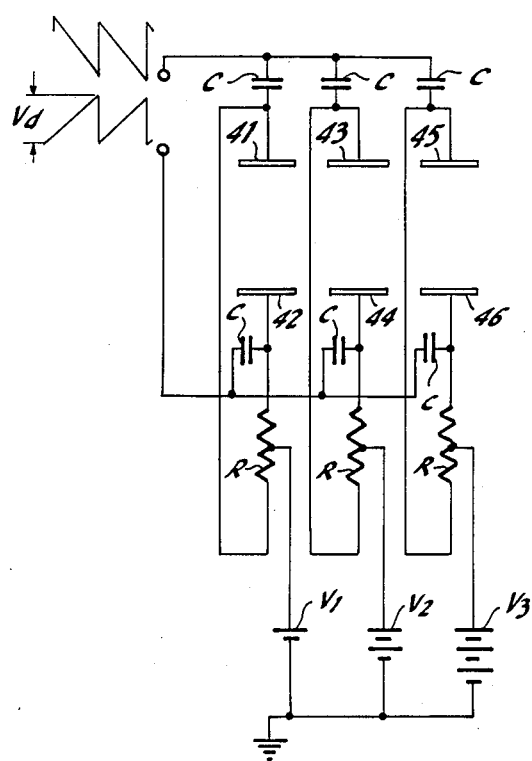
FIG. 2B is a circuit diagram of a drive circuit used for the deflector of FIG. 2A.

FIGS. 2A and 2B are diagrams of a deflector used for a TV picture tube using three electrode pairs and a basic drive circuit therefor. The deflected particles are electrons in this case. Remaining elements of the picture tube, i.e. one or more electron guns, the phosphor screen, and the envelope are not shown for simplicity. In the arrangement of FIGS. 2A and 2B, monotonically increasing d.c. accelerating voltages V1, V2 and V3 are respectively applied to the three pairs of deflection electrodes 41, 42, 43, 44, 45 and 46 while a common sawtooth scanning wave voltage Vd is applied to these three electrode pairs. An electron entering the deflector with an acceleration voltage Vo is accelerated by the voltages V1, V2 and V3 as it passes through the deflector, and receives a deflecting force by the voltage Vd. In this way, the electrons travel along the path 47 shown in FIG. 2A to reach a target, i.e. the phosphor screen in this case, at a speed corresponding to V3.

On the other hand, since there is a step between the d.c. voltages respectively applied to any two consecutive pairs of deflection electrodes, the electric field around the boundary between any two consecutive deflection electrodes is disturbed so the electrodes function as an electronic lens. With such electronic lenses, the electron beam focusing state changes and the deflection characteristic is influenced.

Figure 3A:
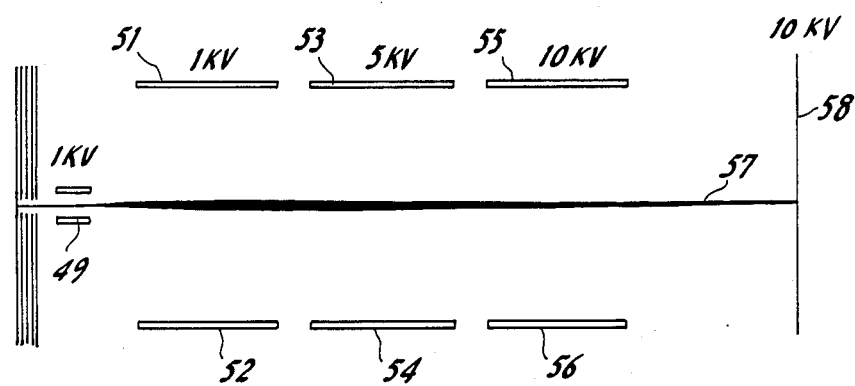
FIGS. 3A and 3B are diagrams of charged-particle beam paths according to the present invention.
Figure 3B:
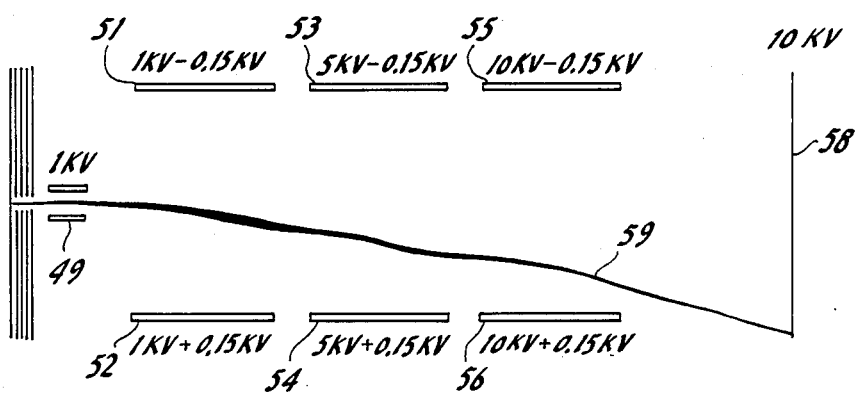

FIGS. 3A and 3B are diagrams of an electron beam path which is obtained through computer simulation by applying deflection voltages of 1 kV to the first stage deflection electrodes 51 and 52, 5 kV to the second stage deflection electrodes 53 and 54, and 10 kV to the third stage deflection electrodes 55 and 56 so as to accelerate electrons. In FIGS. 3A and 3B are respectively shown the focusing states of electron beam 57 for the case of no and full deflection. In the case of FIG. 3B, +0.15 kV and −0.15 kV are respectively applied to the electrodes of each pair of deflection electrodes as deflection voltages as shown. The length of all the deflection electrodes 51–56 is 20 millimeters, while the distance between the third pair of electrodes and a target 58 is 20 millimeters. As is understood from the drawings, the boundary portion between two consecutive pairs of deflection electrodes where the electric field suddenly changes functions as a condenser lens electric field. Thus the beams 57 and 59 are prevented from scattering in response to condensing forces at respective points corresponding to the boundaries. As a result, aberration caused by the deflection electric field is reduced by the present invention.

Furthermore, successive condensing forces are applied to the electron beam by the successive lenses making it possible to obtain a beam with a deep focal depth. A further advantage is that there is a small variation spot caused by the deflection. These advantages become remarkable as the number of pairs of electrodes increases.

Figure 4:
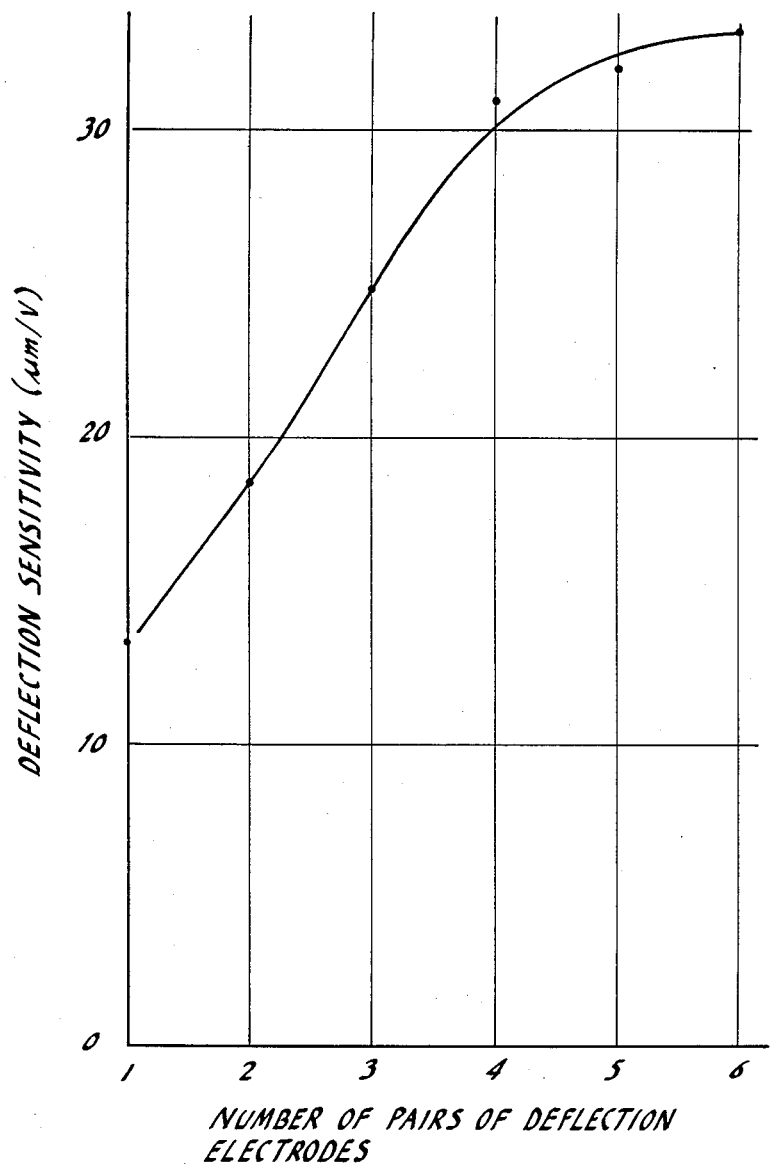
FIG. 4 is a graph of deflection sensitivity of the charged-particle beam deflector according to the present invention.

FIG. 4 is an experimentally determined graph of deflection sensitivity with respect to the number of electron pairs in a multi-deflection electrode pair system. From FIG. 4, the deflection sensitivity substantially increases linearly up to four pairs and then decreases as the number of pairs exceeds four. Therefore, four is most suitable as the number of pairs of deflection electrodes in connection with deflection sensitivity.

Generally speaking, it is most effective when the number "n" of deflection electrode pairs is selected from integers satisfying equation (2):

$$n = L/D \qquad (2)$$

wherein

L is the length of the deflection electrode assembly measured in the direction of nondeflected beam path; and D is the distance between facing electrodes in each pair.

Therefore, the length l of each deflection electrode measured in the direction of nondeflected beam path satisfies the following equation (3):

$$l = L/n \qquad (3)$$

The length l of each deflection electrode is not required to be identical throughout all the deflection electrodes, and the distance D is not required to be uniform throughout all pairs. While it is necessary to apply different d.c. voltages to different pairs of deflection electrodes, these voltage values are determined from the last acceleration voltage and deflection sensitivity, requirements for beam focusing and so on. As shown in FIG. 3B, although the deflecting force to be applied to the electron beam 59 appears to be lower as the beam path is bent radially inwardly due to the influence of the condensing lens between consecutive pairs of deflection electrodes, a deflection displacement over twice that obtained when a d.c. voltage of 10 kV is applied to all the pairs of deflection electrodes can be obtained. This means that the deflection sensitivity has been improved by using a plurality of pairs of deflection electrodes rather than a single pair. If the d.c. voltage applied to the pairs of deflection electrodes is kept at a low voltage, i.e., below 10 kV, so as to accelerate the beam at a later stage of the deflector, it is difficult to obtain a deflection displacement larger than the distance between each pair of deflection electrodes. Furthermore, with such a low voltage the beam path is bent radially inwardly due to the strong electric field of a condensing lens at an outlet of the deflector; therefore, sometimes the case arises where no deflection results.

Figure 5A:
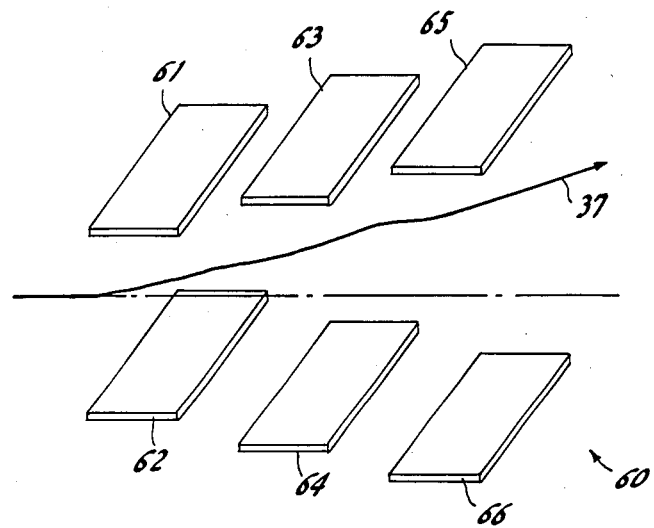
FIG. 5A is a perspective view of a third embodiment of a charged-particle beam deflector according to the present invention.
Figure 5B:
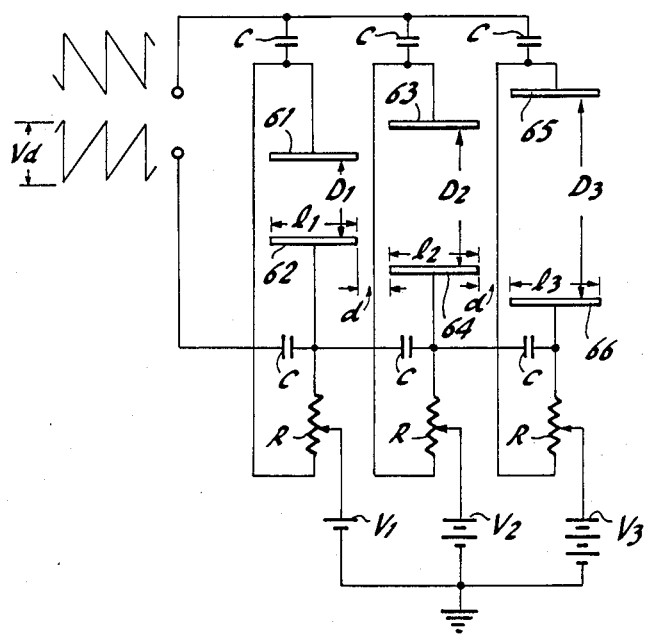
FIG. 5B is a circuit diagram of a drive circuit used for the deflector of FIG. 5A.

FIG. 5A is a perspective view of a third embodiment of deflector 60 according to the present invention, where the deflector comprises three pairs of deflection electrodes arranged substantially in the beam path direction. FIG. 5B is a circuit diagram of a drive circuit used for the deflector 60 of FIG. 5A. Deflection electrodes 61 and 62 are included in a first pair, deflection electrodes 63 and 64 are included in a second pair, and the deflection electrodes 65 and 66 are in a third pair. Assuming that the lengths of the deflection electrodes of the first, second and third pairs are respectively expressed as l1, l2 and l3, and the distances between facing deflection electrodes of the first, second and third pair are respectively expressed as D1, D2 and D3, the distances have the relationship of D1<D2<D3 in this embodiment. In other words, the distance between facing electrodes becomes longer in the beam path direction from the first pair to the third pair. As best seen in FIG. 5B, the respective deflection electrodes are parallel to each other, and thus the distance between facing pair of electrodes is stepwisely widened. In FIG. 5B, there is a length "d" of each gap between two consecutive pairs of deflection electrodes measured in a direction parallel to the deflection electrodes.

The third embodiment of FIGS. 5A and 5B operates as follows, assuming that the charged particles forming the beam are electrons. Respective electrode pairs are applied with different accelerating d.c. voltages V1, V2 and V3, having the relationship of V1<V2<V3. A sawtooth wave deflection scanning voltage Vd applied in common to all the electrode pairs is superimposed on the accelerating d.c. voltages V1, V2 and V3. Therefore, each electron entering the deflector with an accelerating voltage of Vo volts is successively accelerated by the voltages V1, V2 and V3 when passing through the deflector. Predetermined deflecting and condensing forces are simultaneously applied to the electron beam in response to the deflection voltage Vd to cause the beam to reach the target at a speed corresponding to V3 volts after passing through the deflector. In this case the beam reaches the target at a point spaced 12 mm from the target center; this is expressed as deflection displacement ys=12 mm.

Figure 6:
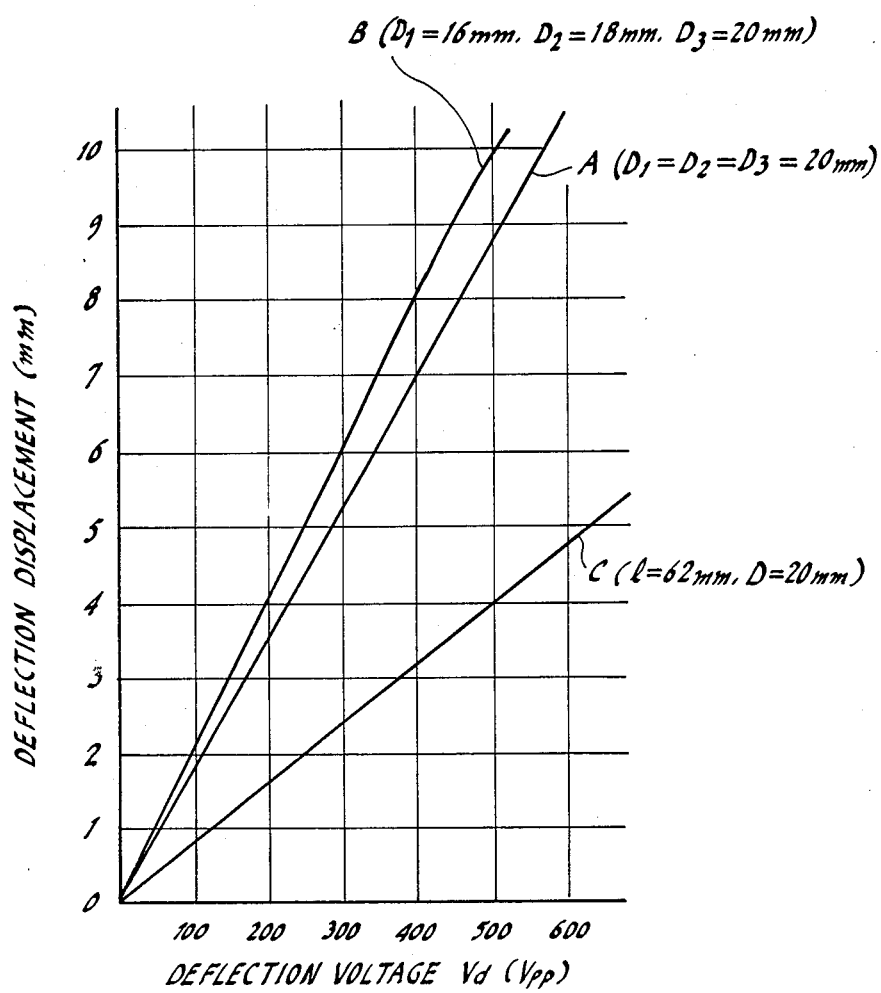
FIGS. 6 and 7 are graphs of deflection sensitivity of the charged-particle beam deflector of FIGS. 5A and 5B.

FIG. 6 is a graph of the relationship between deflection voltage Vd and deflection displacement ys in the arrangement of FIGS. 5A and 5B under conditions such that acceleration voltages are V1=1 kV, V2=5 kV, and V3=10 kV; l1=l2=l3=20 mm; d=1 mm. Different distances D1, D2 and D3 between facing electrode pairs are indicated on the graph to understand the effect of the stepwise arrangement. In detail, a curve A in FIG. 6 is obtained when all the distances D1, D2 and D3 equal 20 mm, while a curve B is obtained when D1=16 mm, D2=18 mm, and D3=20 mm. From a comparison of curves A and B the stepwise arrangement formed by different values for the distances D1, D2 and D3 results in increased deflection sensitivity while deflection linearity does not deteriorate to a noticeable extent. The improved comparison of deflection sensitivity obtained by the three-pair structure with that of a single pair of electrode curve C having a length corresponding to the entire length L of the deflector of FIGS. 5A and 5B with an acceleration voltage of 10 kV is graphically indicated by FIG. 6. The distance between the facing pair of electrodes used for obtaining curve C is 20 mm.

A comparison of curves C and A or B, reveals that the deflection sensitivity in the multi-pair structure has been remarkably improved to twice that of the single-pair structure, and the deflection is determined by the number of pairs and the shape and size of each deflection electrode.

Figure 7:
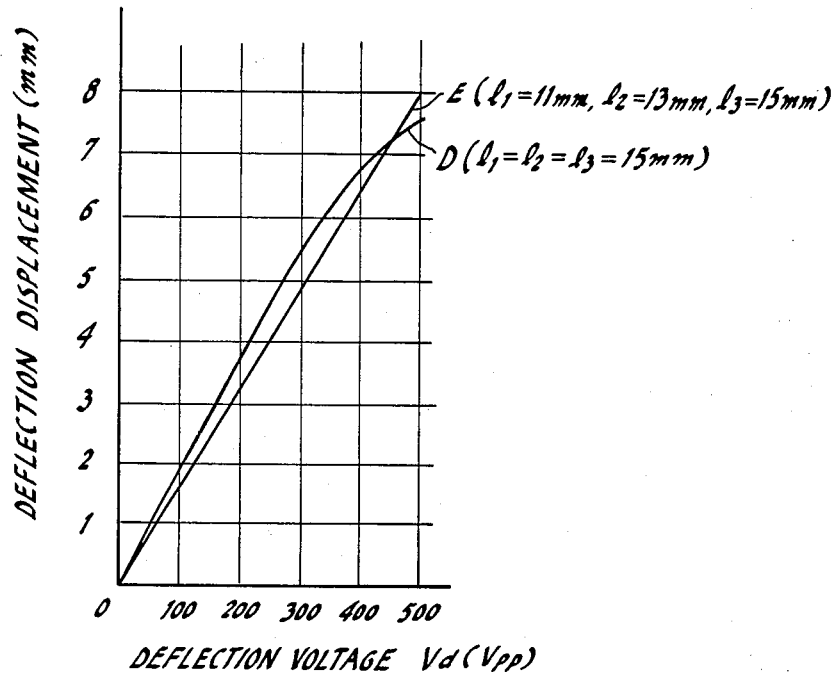

FIG. 7 is a graph of deflection sensitivity similar to that of FIG. 6 with the lengths l1, l2 and l3 of the deflection electrodes being changed such that D1=10.08 mm, D2=12.08 mm, D3=14.08 mm; d=1 mm; V1= 1 kV, V2=5 kV, V3=10 kV. A curve D is obtained when l1=l2=l3=15 mm, while another curve E is obtained when l1=11 mm, l2=13 mm, l3=15 mm. From a comparison between curves D and E, when the lengths l1, l2 and l3 are all identical, the deflection linearity is poor. On the contrary, when the lengths l1, l2 and l3 are selected to increase successively from the first pair to the last pair, there is negligible nonlinearity as indicated by the curve E.

From the above results, it is possible to provide a deflector having a sufficiently high deflection sensitivity with an improved linearity in deflection. In detail, even though linearity deteriorates due to the stepwise arrangement of different values for the distances D1, D2 and D3 for increasing deflection sensitivity, l1, l2 and l3 can be selected such that these values are substantially equal to D1, D2 and D3 respectively, to improve linearity while maintaining high deflection sensitivity.

Generally speaking, for identical values of l1, l2 and l3 and increasing differences or steps between D1 and D2 and between D2 and D3 there is a deterioration in deflection linearity. If the differences or steps between D1 and D2 and between D2 and D3 are fixed, as the lengths l1, l2 and l3 decrease, there is no decrease in deflection linearity, but there is lowered deflection sensitivity. On the other hand, as l1, l2 and l3 increase, there is higher deflection sensitivity, but there is a tendency to reduce the length of the region over which deflection sensitivity linearity is maintained. This can be explained from the fact that, when the amount of deflection in each pair of deflection electrodes is increased, the electron beam responds to distortion in the electric field between each pair of deflection electrodes so that the final amount of deflection linearity has a poor characteristic. Therefore, it is necessary to consider this point when designing and selecting the shape and size of deflection electrodes and operating voltages. Therefore, in order to satisfy both linearity and sensitivity of deflection the sizes of the multi-pair deflector may be selected such that D1 substantially equals l1, D2 substantially equals l2, D3 substantially equals l3, and so on. Therefore, if deflection linearity requirements are not very severe, the values to be selected as these sizes, such as l1 and D1, may be changed within permitted limits. While sizes of the respective deflection electrodes are selected as described above, the limit on the length of the pair of last delfection electrodes is removed if the electric potential thereof is equal to that of the target and if no distortion occurs in the electric field after the last pair of deflection electrodes.

Figure 8:
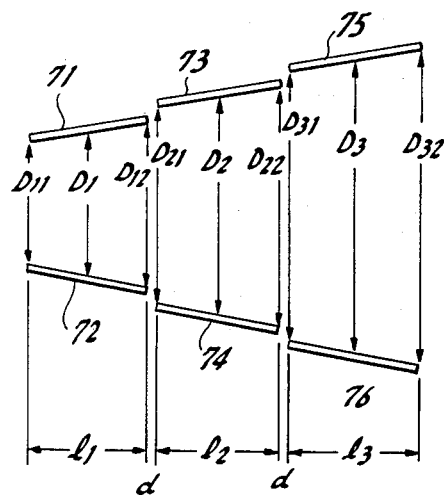
FIG. 8 is a side view of a fourth embodiment of the charged-particle beam deflector according to the present invention.

The pairs of facing deflection electrodes may be inclined in a tapered manner as shown in FIG. 8. In detail, respective electrodes 71, 72, 73, 74, 75 and 76 of the first to third pairs are arranged such that the distance between facing electrodes increases along the electron beam path, with a step between adjacent electrodes. Assuming that the distances at the inlet and outlet sides of the resepctive pairs are expressed in terms of D11, D12, D21, D22, D31 and D32, these distances have the relationship of D11<D12<D21<D22<D31<D32. In addition, there is a step between any adjacent electrodes 71 and 73; 73 and 75; 72 and 74; 74 and 76. In the inclined deflection electrode arrangement of FIG. 8, the average distances between facing electrodes are as follows:

$D1=(D11+D12)/2$
$D2=(D21+D22)/2$
$D3=(D31+D32)/2$

As indicated in these equations, the average distance values at the inlet and outlet of each pair are used to determine the values of D1, D2 and D3, which may be used in the same manner as the values described with reference to FIGS. 5A and 5B.

Figure 9:
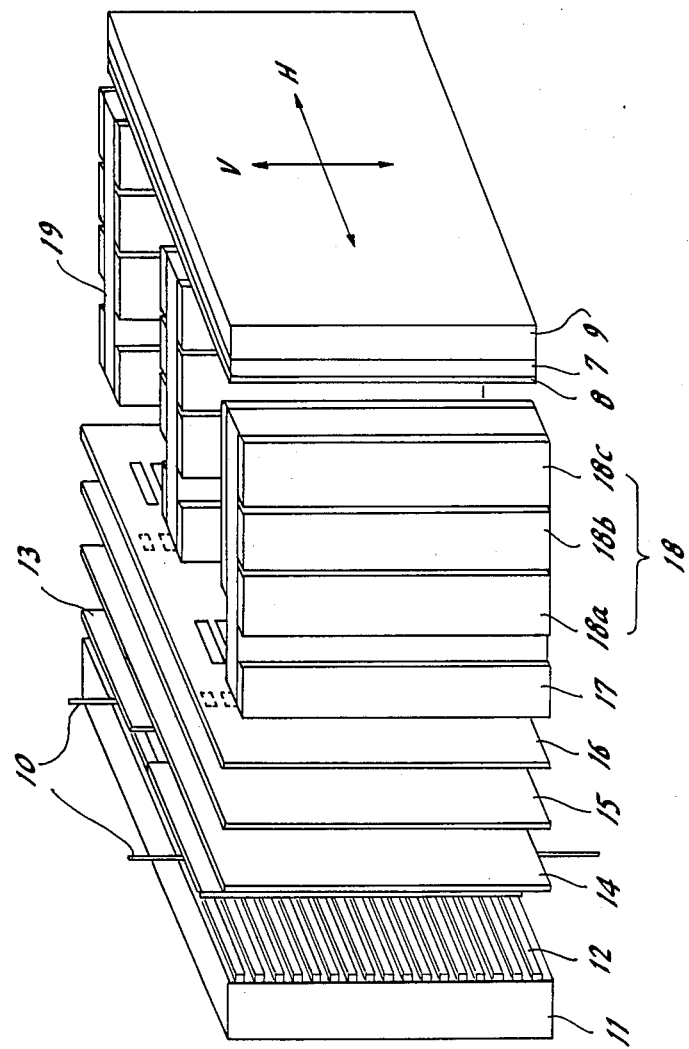
FIG. 9 is a perspective view of a flat CRT using the deflector according to the present invention.
Figure 10:
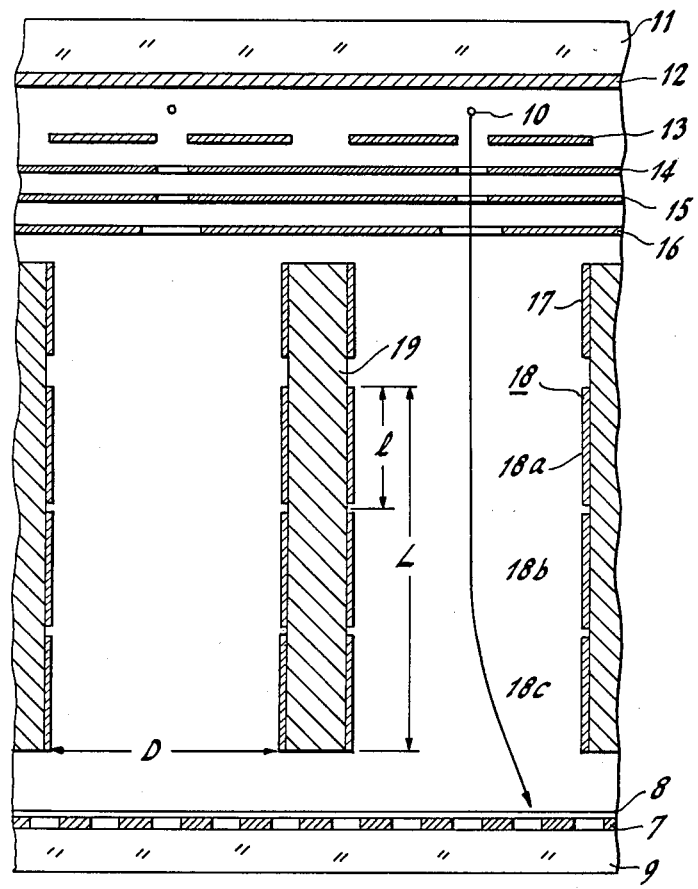
FIG. 10 is a horizontal cross-sectional view of the flat CRT of FIG. 9.

Reference is now made to FIG. 9, a perspective view of a flat CRT using the above-described charged-particle beam deflector according to the present invention. FIG. 10 is a cross-sectional view of the flat CRT of FIG. 9 taken along a horizontal line. The structure of the flat CRT shown in FIGS. 9 and 10 is substantially the same as that shown in FIGS. 4 and 5 of co-pending application Ser. No. 748,833; this structure is described infra. A plurality of vertically elongated linear cathodes 10 are arranged horizontally with equal pitch in a location corresponding to an image display region. A linear cathode is located at an index region. On insulating member 11, at the rear side of the linear cathodes 10, there are plural vertical scanning electrodes 12 arranged in the vertical direction with equal pitch. The vertical scanning electrodes 12 extend in the horizontal direction and are electrically insulated from each other. In order to display an NTSC television image, four hundred and eighty vertical scanning electrodes 12 are vertically arranged. Successively arranged between the linear cathodes 12 and face plate 9 are: (1) a first grid electrode 13 (hereinafter called "G1 electrode") including plural separated electrodes each having apertures formed at positions corresponding to the linear cathodes 10 to modulate the electron beam with video signals, (2) second planar grid electrode 14 (hereafter called "G2 electrode") having apertures aligned with those of the G1 electrode 13 and arranged to receive a voltage higher than that applied to the G1 electrode for accelerating the electron beam, (3) third grid electrode 15 (hereafter called "G3 electrode") having the same structure as that of the G2 electrode, (4) fourth planar grid electrode 16 (hereafter called "G4 electrode") having apertures wider in the horizontal direction than those of G2 electrode or G3 electrode, (5) horizontal focusing electrode 17 (hereafter called "$F_H$ electrode") for slightly horizontally deflecting and horizontally focusing the electron beam propagated through the apertures of each of the electrodes 13, 14, 15 and 16, and (6) deflecting electrodes 18 (hereafter called "$D_H$ electrode") for horizontally deflecting the electron beam. On inner surface of the face plate 19 are light emitting phosphor layer 7 and metal back electrode 8. Insulating member 19 supports electrodes 17 and 18.

The linear cathodes 10 emit electron beams when heated with a prescribed applied voltage. When voltages nearly equal to the cathode potential are applied to the vertical scanning electrodes 12 and the G1 electrode 13, and a higher voltage (about 100 to 300 volts) than the cathode potential is applied to the G2 electrode 14, the electron beams flow through the apertures of the G1 and G2 electrodes. The electron beam current is adjustable by regulating the potential of the G1 electrode 13. The electron beams flow in sequence to the G3 electrode, the G4 electrode 16 and to the $F_H$ electrode 17.

The electron beam passing through the horizontal focusing electrodes 17 are deflected by a given distance in response to a horizontal deflecting force that is applied simultaneously with a focusing force. The simultaneous forces result from a sawtooth wave or stepwise wave deflection voltage and an accelerating voltage being applied to three pairs of deflection electrodes 18a, 18b and 18c forming the deflector 18. After the electron beam has been deflected, it is incident on phosphor screen 7. The horizontally deflected electron beam path illustrated in FIG. 9 corresponds to that shown in FIG. 3B when voltages at the horizontal focusing electrode 17 (50 in FIG. 3B), the deflection electrodes 18a, 18b and 18c (51-52, 53-54, and 55-56 in FIG. 3B) and the screen 58 in FIG. 3B are respectively 1 kV, 1 kV, 5 kV, 10 kV, and 10 kV; the deflection voltage being 300 $V_{pp}$; and the distance between the facing horizontal deflection electrodes being 13.48 mm. From FIG. 3B, the electron beam finally reaches the phosphor screen 58 after being subjected to deflection and focusing such that the electron beam entering the region of the horizontal deflecting electrode 18a is deflected with a first deflecting force; then the beam responds to a focusing force due to electrostatic lens caused by a voltage difference of 4 kV in the region between the deflection electrodes 18a and 18b, the beam being pushed back toward the deflection direction due to electric field edge effects; the beam is deflected again as it enters the region where deflection electrodes 18b are located.

Figure 11:
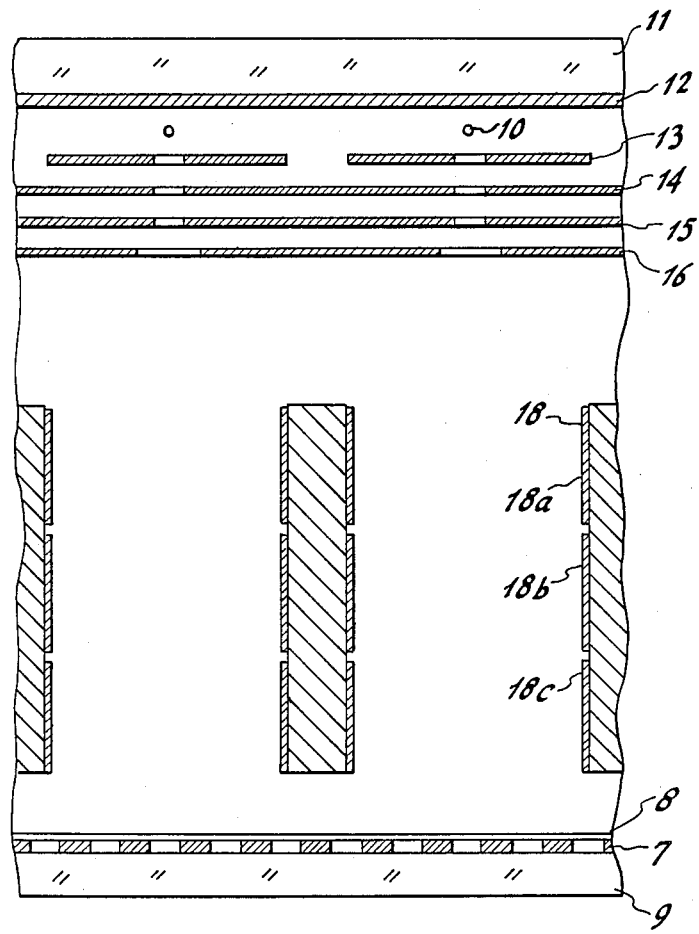
FIG. 11 is a horizontal cross-sectional view of a flat CRT according to the present invention.

FIG. 11 is a diagram of another embodiment of a flat CRT according to the present invention. This embodiment differs from the above-described embodiment of FIG. 10 in that no horizontal focusing electrode is provided. As described with reference to FIG. 3B, the use of plural pairs of deflection electrodes results in deflector 18 deflecting and focusing the beam. Therefore, it is possible to focus the electron beam on the phosphor screen 7 even though the horizontal focusing electrode 17 is not provided.

Figure 12A:
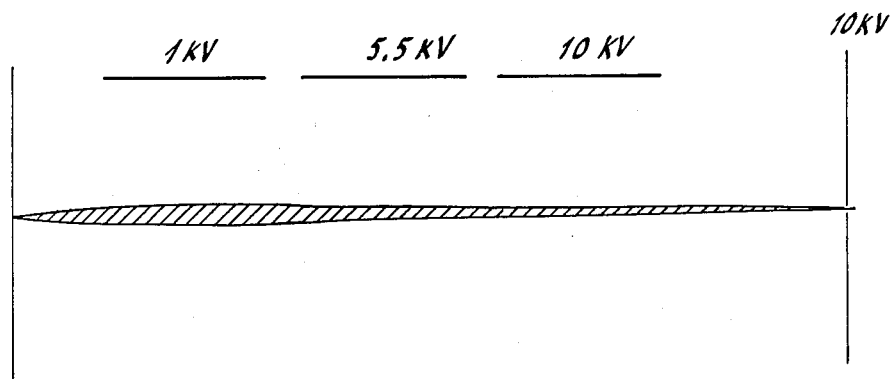
FIGS. 12A and 12B are diagrams of charged-particle beam paths in the structure of FIG. 11.
Figure 12B:
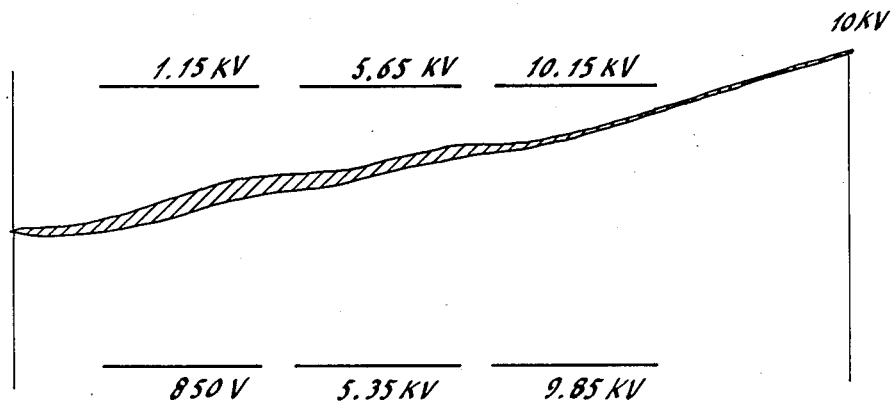

FIGS. 12A and 12B are graphs of computation results of the electron beam horizontal path in the arrangement of FIG. 11. In FIGS. 12A and 12B, the beam paths are respectively illustrated without and with full deflection. The deflection sensitivity is 25.6 m/V when the horizontal focusing electrode 17 (see FIG. 10) is provided, whereas the deflection sensitivity is 26.8 m/V when the horizontal focusing electrode 17 is not provided. A comparison between these two cases reveals deflection sensitivity has been improved by approximately 5 percent when the horizontal focusing electrode 17 is removed.

The deflector according to the present invention may also be applied to vertical deflection to obtain the same results as those described in the above. Furthermore, the present invention is also applicable to a shadow mask tube having electron beams in the horizontal deflecting electrode region. The plural deflection electrodes forming the deflector may also be arranged so that the distance between facing pairs of electrodes increases in the beam path direction as shown in FIGS. 5A, 5B and 8.

FIG. 13 is a perspective view of another embodiment of a flat CRT using the deflector according to the present invention, wherein referene numerals 7 through 16 are for the same elements as in FIG. 9. Vertical deflection electrodes 20 and 21 respectively correspond to electrodes 328 and 329 in FIG. 32 of the above-mentioned co-pending application (Ser. No. 748,833). The first horizontal deflection electrode (hereafter referred to as DH-1) 18a' and the third horizontal deflection electrode (hereafter referred to as DH-3) 18c' are respectively formed by vapor deposition or plating a metal on an insulating plate 19' at a given position. Two of the insulating plates 19' on which a metal is deposited are fitted in grooves of H-shaped, vertically extending metallic post 22, so that DH-1 18a' and DH-3 18c' are fixed. Then a 0.1 to 0.2 mm-thick metallic plate is welded to a surface of the metallic post 22, which surface is parallel to DH-1 and DH-3, to form a second set of horizontal deflection electrodes (hereafter referred to as DH-2) 18b'. When viewed in a direction of an arrow Y in FIG. 13, namely, in a transverse direction, DH-2 18b' at least partially overlaps Dh-1 18a', to be parallel to DH-3 18c' and to be spaced apart by a given distance from DH-3 18c'.

Figure 14A:
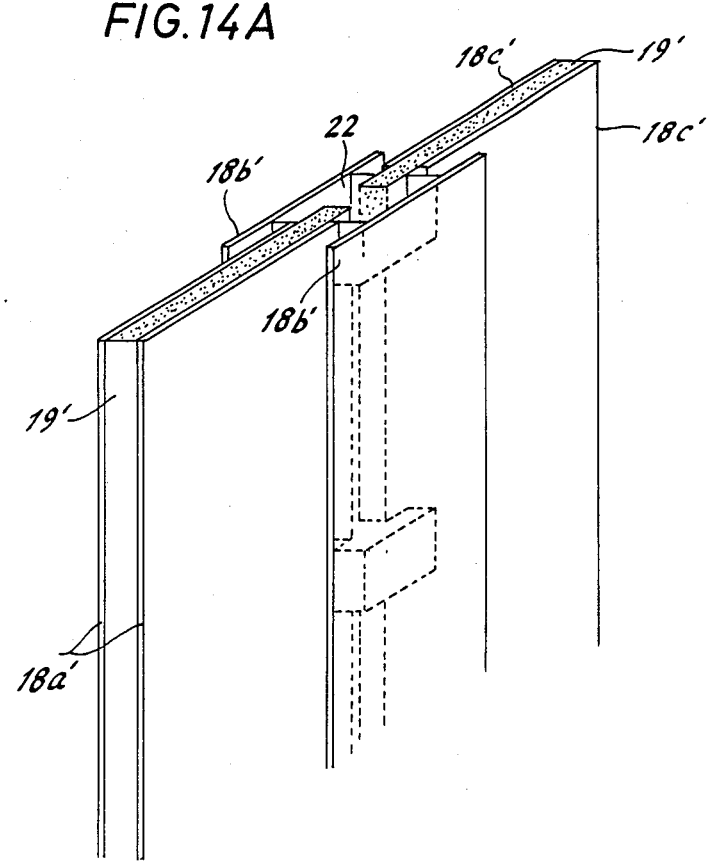
FIGS. 14A, 14B, 15 and 16 are diagrams of further embodiments of a flat CRT according to the present invention.
Figure 14B:
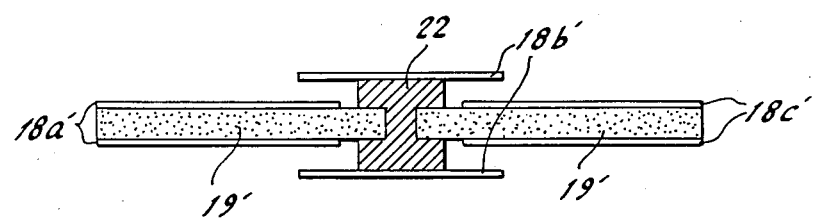

FIGS. 14A and 14B are respectively perspective and cross-sectional views of another embodiment of a horizontal deflector. This deflector is substantially the same as that of FIG. 13 except for light-weight H-shaped metallic post 22. In detail, the metallic post 22 has the H-shaped structure at an interval along its longitudinal direction as shown in FIG. 14A so that the weight is reduced compared to the metallic post of FIG. 13. DH-1 18a' and DH-3 18c' are formed respectively by depositing metal on the insulting plate at given position. If desired, however, a single metallic plate is used for each of DH-1 18a' and DH-3 18c'. In this case, the metallic post 22 is covered by an insulating film at its surfaces other than those where the metallic plate of DH-2 18b' is welded, or the metallic plate 22 is entirely covered by an insulating film and then metallic film portions are formed where the metallic plate of DH-2 18b' is to be provided.

Figure 15:
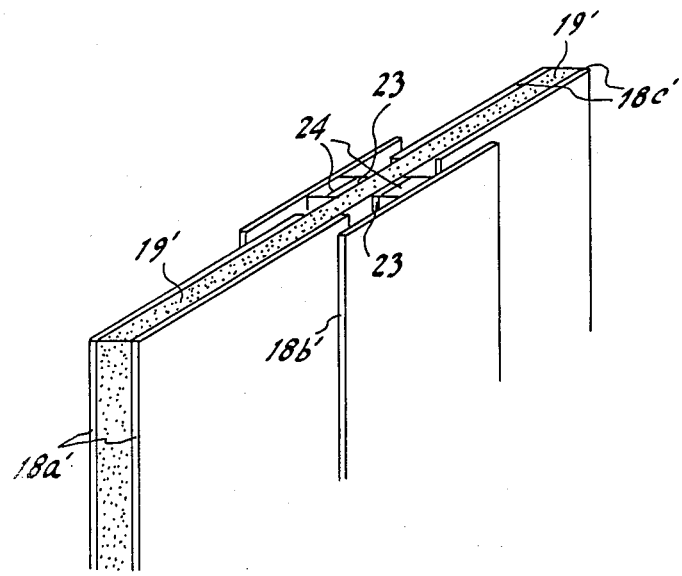

FIG. 15 is a perspective view of another embodiment of the horizontal deflector electrode. DH-1 18a' and DH-3 18c' are formed by depositing a metallic film on an insulating plate 19', such as a glass plate or the like, by vapor deposition or plating on given surfaces. Between DH-1 18a' and DH-3 18c' are metallic plates 23 on the surfaces of the insulating plate 19' apart from DH-1 18a' and DH-3 18c'. Then metallic bars 24, each having a given thickness, are welded to the metallic plates 23, respectively, and metallic plates, to be used as DH-2 18b', are welded to the surfaces of the metallic bars 24 respectively.

Figure 16:
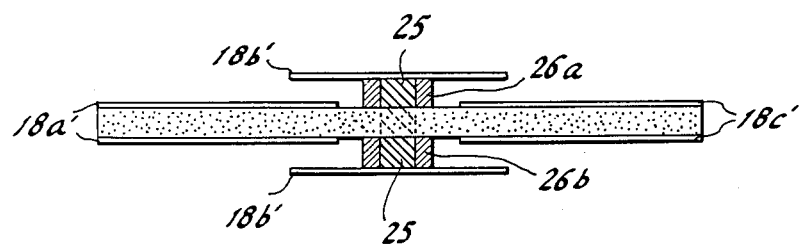

FIG. 16 is a cross-sectional embodiment of a horizontal deflector electrode. Metallic plates are attached to given surfaces of an insulating plate 19', such as a glass plate, in the same manner as in FIG. 14 to form DH-1 18a' and DH-2 18c'. A plurality of through-holes extend vertically with respect to the plane of the insulating plate 19 through insulating plate 19' between DH-1 18a' and DH-2 18c'. Metallic posts 25, each having a given length, extend into these through-holes. Each of the metallic posts 25 is covered by hollow cylindrical insulating members 26a and 26b at both sides of the insulating plate 19', and then metallic plates 18b' are welded to both ends of each of the metallic posts 25 to form DH-2.

As described in the above, DH-1 through DH-3 can be readily assembled as of integral construction. It is also possible to provide an arrangement where the surfaces of an insulating member cannot be seen from the beam path when viewed from the beam.

Figure 17:
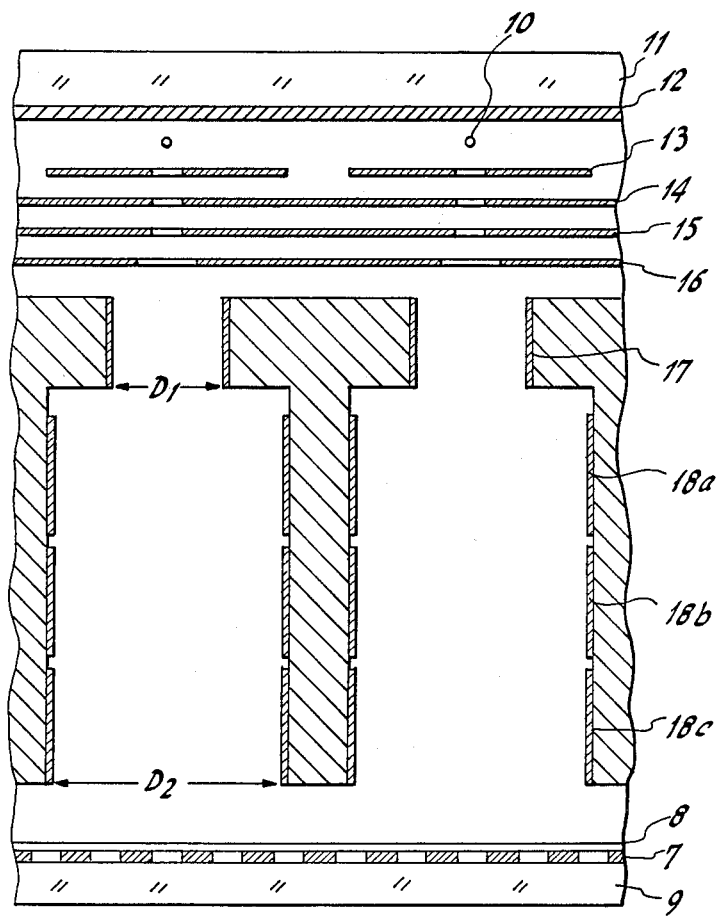
FIG. 17 is a horizontal cross-sectional view of another embodiment of a flat CRT according to the present invention.
Figure 18:
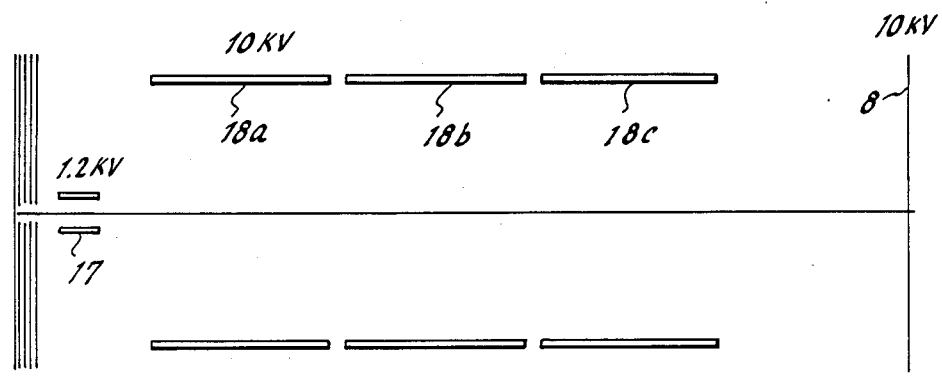
FIGS. 18 and 19 are diagrams of electron beam paths in the flat CRT according to the present invention.

FIG. 17 is a horizontal cross-sectional view of a flat CRT according to the present invention. The flat CRT of FIG. 17 differs from that of FIG. 10 in that the distance D1 between facing horizontal focusing electrodes 17 is smaller than the distance D2 between facing horizontal deflection electrodes 18, and thus description is made in connection with only the horizontal focusing electrodes 17. In FIG. 18 is shown the computation results of a horizontal electron beam path under the condition that 1.2 kV is applied to the horizontal focusing electrodes 17, 10 kV is applied to the horizontal deflection electrodes 18a', 18b' and 18c', and 10 kV is applied to the screen 8, G4 electrode 16 has an aperture width in the horizontal direction of 0.8 mm, the distance D1 between the pair of horizontal focusing electrodes 17 is 2 mm, and the distance D2 between the pair of horizontal deflection electrodes 18a, 18b and 18c is 15 mm.

Figure 19:
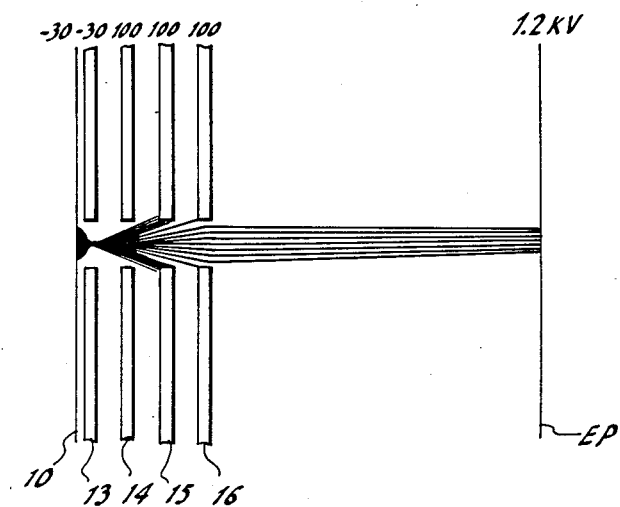

In FIG. 19 are shown the computation results of a vertical electron beam to the horizontal focusing electrodes 17 under the same conditions as those in FIG. 18, with the additional condition that an aperture width of the G4 electrode 16 in the vertical direction is 0.3 mm. An equipotential surface EP of 1.2 kV is formed by the horizontal focusing electrodes 17 of FIG. 18. In the flat CRT using linear hot-cathode 10, it is inevitable that the vertical and horizontal focusing systems differ. In the horizontal focusing system of FIG. 18, a crossover point is made by an electric field between the G4 electrode 16 and the horizontal focusing electrodes 17, and the beam is focused by an electric field between the horizontal focusing electrodes 17 and the horizontal deflection electrodes 18. Similarly, in the vertical focusing system of FIG. 19, the beam is focused by an electric field between the G4 electrode 16 and the horizontal focusing electrodes 17. Therefore, it is necessary to strengthen the vertical lens electric field between G4 electrode 16 and the horizontal focusing electrode 17 and to strengthen the horizontal lens electric field between horizontal focusing electrodes 17 and the horizontal deflection electrodes 18. This can be achieved by forming a vertical focusing lens electric field having a vertical electric field variation concentrated on this portion by making the vertical width of the aperture of the G4 electrode 16 narrower than the horizontal width of the aperture, and by concentrating the horizontal focusing lens electric field on this portion by making the distance D1 between the pair of horizontal focusing electrotides 17 smaller than the distance D2 between the pair of horizontal deflection electrodes 18.

The above-mentioned results can also be obtained in a structure where vertical and horizontal deflection are exchanged. In such a structure, it is necessary for plural linear cathodes 10 to extend vertically, and to employ a horizontal deflecting unit for changing electron beams in horizontal deflection direction.

Three pairs of deflection electrodes 18a, 18b and 18c are arranged to receive different d.c. voltages to which a deflection voltage is superimposed in common, to substantially eliminate beam focusing aberration in the deflection direction to achieve satisfactory beam focusing and high deflection sensitivity.

While the above embodiments have been described such that the distance D1 between the pair of horizontal focusing electrodes 17 is smaller than the distance D2 between the pair of horizontal deflection electrodes 18a and so on, the vertical and horizontal relationship may be reversed to obtain the same results. More particularly, the distance between the vertical focusing electrodes may be smaller than the distance between vertical deflection electrodes in a CRT having a pair of horizontal focusing electrodes, a pair of vertical focusing electrodes, and one or more pairs of vertical deflection electrodes arranged successively between an electron source and a screen in a vacuum tube.

What is claimed is:

1. A charged-particle beam deflector for use in a deflection system for simultaneously uniformly deflecting plural charged-particle beams arranged in line, comprising a plurality of pairs of facing electrodes having planar deflecting surfaces having elongated surfaces in the direction of beam propagation, each of said pairs being at a different location along the propagation direction of each beam, first means for separately applying different d.c. voltages to said plurality of pairs of facing electrodes for providing focusing forces between the electrodes of each electrode pair so that different focusing forces are applied between the electrodes of each electrode pair, and second means for applying an a.c. deflection voltage having the same amplitude to all of said pairs in common so that the same deflecting force is applied to the electrodes of each electrode pair, adjacent electrode pairs being spaced and insulated from each other so that a condenser lens electric field subsists between them.

2. A charged-particle beam deflector as claimed in claim 1, wherein at least three pairs of said facing electrodes are provided, and said first means is arranged so that the d.c. voltages applied to said plurality of pairs either increase or decrease along the direction of beam propagation.

3. A charged-particle beam deflector as claimed in claim 1, wherein said first means is arranged to apply a voltage, which is substantially equal to the d.c. potential at a first electrode of a CRT in which said deflector is used, to one of said pairs of electrodes located at one end of said deflector closest to said first electrode, and to apply another voltage, which is substantially equal to the d.c. potential at a second electrode of said CRT, to another pair of electrodes located at the other end of said deflector closest to said second electrode, thereby obviating the presence of electrostatic lenses at the rear and front portions of said deflector.

4. A charged-particle beam deflector as claimed in claim 1, wherein the number of said pairs of deflection electrodes is an integer "n" which is 2 or more and is given by:

$$n = D/L$$

where
L is a length of the deflector measured in a direction of nondeflected beam path; and
D is the distance between said facing deflection electrodes.

5. A charged-particle beam deflector as claimed in claim 1, wherein the distance between the facing deflection electrodes increases in the direction of the beam propagation such that the distance increases either stepwisely or substantially continuously to form either a stepped structure or a tapered structure.

6. A charged-particle beam deflector as claimed in claim 5, wherein the length of each deflection electrode in one of said pairs and the distance between facing deflection electrodes of said pair are different from those of other parts.

7. A charged-particle beam deflector as claimed in claim 5, wherein the length of each deflection electrode and the distance between facing deflection electrodes are identical for all of said plurality of pairs except for a last pair located at an outlet of said deflector.

8. A flat CRT comprising:
(a) a vacuum tube
(b) a vertical scanning portion for changeover of electron beams in the vertical direction;
(c) a plurality of linear hot-cathode electrodes having a predetermined pitch for deriving the electron beams;
(d) first grid electrode means for modulating said electron beams with a video signal;
(e) second grid electrode means for acclerating said electron beams;
(f) a plurality of pairs of facing horizontal deflection electrodes for deflecting each of said electron beams so that for each electron beam different plural deflection electrodes are provided, the electrodes of each pair having elongated surfaces in the direction of beam propagation, each of said pairs being at a different location along the propagation direction of each beam and arranged so each of said pairs is at a different position along the direction of beam propagation;
(g) first means for applying different d.c. voltages to said plurality of pairs of facing electrodes for providing focusing forces between the electrodes of each electrode pair so that different focusing forces are applied between the electrodes of each electrode pair;
(h) second means for applying a deflection voltage having the same amplitude to all of said pairs in common so that the same deflecting force is applied to the electrodes of each electrode pair, adjacent electrode pairs being spaced and insulated from each other so that a condenser lens electric field subsists between them; and
(i) a screen means having a phospher body and a metal back on which said beams are incident.

9. A flat CRT as claimed in claim 8, wherein each of said linear hot-cathode electrodes extends vertically so that plurality of the same are arranged in the horizontal direction.

10. A flat CRT as claimed in claim 8, wherein at least three pairs of said facing horizontal deflection electrodes are provided, and said first means is arranged so that the d.c. voltages increases in the propagation direction of the nondeflected beam.

11. A flat CRT as claimed in claim 8, wherein the distance between said facing horizontal deflection electrodes increases in the direction of the beam propagation such that the distance increases either stepwisely or substantially continuously to form either a stepped structure or a tapered structure.

12. A flat CRT as claimed in claim 8, wherein said plurality of horizontal deflection electrodes located one one side with respect to said beam are mechanically assembled in an integral structure.

13. A flat CRT as claimed in claim 8, wherein said plurality of horizontal deflection electrodes located on one side with respect to said beam are located such that the distance between the center of the nondeflected beam path and at least one of said horizontal deflection electrodes of said one side is different from the distance between the center of the nondeflected beam path and the remaining horizontal deflection electrodes so that adjacent horizontal deflection electrodes overlap each other.

14. A flat CRT as claimed in claim 12, wherein said plurality of horizontal deflection electrodes located on one side with respect to said beam are assembled in an integral structure having at least one insulating member after being formed independently from each other.

15. A flat CRT as claimed in claim 12, wherein at least one of said plurality of horizontal deflection electrodes located on one side with respect to said beam is formed on a surface of an insulating plate to have a given size, and the remaining horizontal deflection electrodes on said side are formed of metal plates secured to a member having a given thickness, said member being attached to said insulating plate.

16. A flat CRT as claimed in claim 8, further comprising a pair of horizontal focusing electrodes positioned upstream in the direction of beam propagation of said horizontal deflection electrodes, the distance between said pair of horizontal focusing electrodes being smaller than the distance between said pair of horizontal deflection electrodes.

17. A flat CRT comprising:
(a) an evacuated envelope;
(b) an electron beam generating means in said envelope;
(c) a screen means in said envelope;
(d) first electrode means in said envelope for focusing a beam from said electron beam generating means in a first direction;

(e) second electrode means in said envelope having a pair of facing electrodes for deflecting and focusing said beam in a second direction which is normal to said first direction;

(f) third electrode means in said envelope having one or more pairs of facing electrodes for deflecting said beam in said second direction; each of said electrode pairs being at a different position along the direction of beam propagation, the electrodes of the second and third electrode means having elongated surfaces in the direction of beam propagation, said first to third electrode means being arranged in order, the distance between said pair of facing electrodes of said second electrode means being smaller than the distance between said pair of facing electrodes of said third electrode means;

(g) first means for applying different d.c. voltages to said plurality of pairs of facing electrodes for providing focusing forces between the electrodes of each electrode pair so that different focusing forces are applied between the electrodes of each electrode pair;

(h) second means for applying a deflection voltage having the same amplitude to all of said pairs in common so that the same deflecting force is applied to the electrodes of each electrode pair, adjacent electrode pairs being spaced and insulated from each other so that a condenser lens electric field subsists between them.

18. A flat CRT as claimed in claim 17, wherein said first electrode means has an aperture having a width in said second direction greater than the width thereof in said first direction.

19. A flat CRT as claimed in claim 17, wherein said electron beam generating means comprises a plurality of linear cathode electrodes arranged in said second direction, and a plurality of elongated electrodes located in said envelope behind said linear cathode electrodes with an equal pitch in said first direction.

20. In combination, a charged-particle beam source, a target for the beam, means between the source and target for deflecting the beam, the target being positioned at right angles to the direction of beam propagation through the deflecting means while the beam is not deflected by the deflecting means, the deflecting means including n pairs of deflecting electrodes having opposed planar surfaces such that the electrodes of each pair are at a different position along the direction of beam propagation, where n is an integer greater than one, the planar surfaces of each of the deflecting electrodes having a length in the direction of beam propagation considerably greater than the distance between adjacent pairs of said electrodes, means for applying monotonically changing d.c. voltages to the electrodes of each pair as a function of distance between the source and target, and means for simultaneously applying the same deflection voltage across the electrodes of all n pairs of said electrodes.

21. The combination of claim 20 wherein the planar surface each of the deflecting electrodes in parallel to the beam propagation direction while the beam is not deflected by the deflection means, and the distance between the opposed electrodes of electrode pair k is D, where k is selectively every integer from 1 to n and D is the same for each value of k.

22. The combination of claim 21 wherein $n=L/D$ and $l=L/n$, where
L=length of the means for deflection in the direction of beam propagation, and
l=the length of the planar surface of each deflecting electrode in the direction of beam propagation.

23. The combination of claim 20 wherein the distance between the planar surfaces of the opposed electrodes of each electrode pair increases monotonically in the direction of beam propagation from the source toward the target.

24. The combination of claim 23 wherein the planar surfaces of each of the electrodes are parallel to the beam propagation direction while the beam is not deflected by the deflection means.

25. The combination of claim 23 wherein the planar surface of each of the electrodes is tilted relative to the beam propagation direction while the beam is not deflected by the deflection means.

26. The combination of claim 20 wherein the planar surface of each of the electrodes is tilted relative to the beam propagation direction while the beam is not deflected by the deflection means.

27. The combination of claim 26 wherein the planar surface of each of the electrodes is tilted by the same angular extent, the tilt angles of the planar surfaces of the opposite electrodes in each electrode pair being opposite relative to the beam propagation direction.

28. The combination of claim 27 wherein the distance between the planar surfaces of the opposed electrodes of each electrode pair increases monotonically in the direction of beam propagation from the source toward the target.

29. The combination of claim 28 wherein the distance between the planar surfaces of the electrodes of pair k at the ends of the electrodes in pair k closest to the source is greater than the distance between the planar surfaces of the electrodes of pair (k−1) at the ends of the electrodes in pair (k−1) closest to the target.

30. The flat CRT of claim 8 wherein each pair of the horizontal deflection electrodes includes opposed facing planar surfaces.

31. The flat CRT of claim 17 wherein each pair of electrodes of the third electrode means includes opposed facing planar surfaces.

* * * * *